US012300088B2

(12) United States Patent
Zheng et al.

(10) Patent No.: US 12,300,088 B2
(45) Date of Patent: May 13, 2025

(54) EYESIGHT PROTECTION DEVICE, EYESIGHT PROTECTION SYSTEM AND DETECTION METHOD FOR EYESIGHT PROTECTION DEVICE

(71) Applicants: BEIJING BOE SENSOR TECHNOLOGY CO., LTD., Beijing (CN); BOE TECHNOLOGY GROUP CO., LTD., Beijing (CN)

(72) Inventors: Xiao Zheng, Beijing (CN); Jiaqiang Wang, Beijing (CN); Yonghui Wang, Beijing (CN); Zhong Hu, Beijing (CN); Shaobo Han, Beijing (CN); Guo Liu, Beijing (CN); Wei Sun, Beijing (CN); Chen Meng, Beijing (CN); Feng Qu, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/792,980

(22) PCT Filed: Sep. 17, 2021

(86) PCT No.: PCT/CN2021/119018
§ 371 (c)(1),
(2) Date: Mar. 23, 2023

(87) PCT Pub. No.: WO2023/039822
PCT Pub. Date: Mar. 23, 2023

(65) Prior Publication Data
US 2024/0177590 A1 May 30, 2024

(51) Int. Cl.
*G08B 21/24* (2006.01)
*A61H 5/00* (2006.01)
*G08B 7/06* (2006.01)

(52) U.S. Cl.
CPC ............... *G08B 21/24* (2013.01); *A61H 5/00* (2013.01); *G08B 7/06* (2013.01)

(58) Field of Classification Search
CPC ............. G08B 21/24; G08B 7/06; A61H 5/00
See application file for complete search history.

(56) References Cited

U.S. PATENT DOCUMENTS

2008/0100468 A1* 5/2008 Xu ......................... G08B 21/24 340/691.1
2013/0235346 A1* 9/2013 Huang ................... A61B 3/152 351/208

(Continued)

FOREIGN PATENT DOCUMENTS

CN 2075955 U 5/1991
CN 101211494 A 7/2008

(Continued)

OTHER PUBLICATIONS

English translation of CN112116049A, Wang et al, 2020 (Year: 2020).*

(Continued)

*Primary Examiner* — Nabil H Syed
*Assistant Examiner* — Cal J Eustaquio
(74) *Attorney, Agent, or Firm* — Nath, Goldberg & Meyer; Joshua B. Goldberg

(57) ABSTRACT

The present disclosure provides an eyesight protection device, an eyesight protection system and an detection method for the eyesight protection device, which belongs to the technical field of communication, and can solve some problems in the prior art. The present disclosure provides an (Continued)

eyesight protection device, which includes: a millimeter-wave radar detection circuit, a control circuit and an alarm circuit. The millimeter-wave radar detection circuit is configured to detect a distance between a user and a reading material read by the user. The control circuit is configured to generate a first control signal at least when it is determined that the distance detected by the millimeter-wave radar detection circuit is smaller than a first predetermined value. The alarm circuit is configured to send out an alarm signal in response to the first control signal.

16 Claims, 12 Drawing Sheets

(56) References Cited

U.S. PATENT DOCUMENTS

| | | | | |
|---|---|---|---|---|
| 2015/0057775 | A1* | 2/2015 | Dong | A63B 69/0071 700/91 |
| 2016/0343163 | A1* | 11/2016 | Venkatesha | G01S 5/02 |
| 2017/0263102 | A1* | 9/2017 | Tshilombo | G01F 22/00 |
| 2021/0133607 | A1* | 5/2021 | Stubbs | G06N 20/00 |

FOREIGN PATENT DOCUMENTS

| | | | |
|---|---|---|---|
| CN | 103873793 | A | 6/2014 |
| CN | 204706160 | U | 10/2015 |
| CN | 105321303 | A | 2/2016 |
| CN | 206012105 | U | 3/2017 |
| CN | 211062146 | U | 7/2020 |
| CN | 112116049 | A | 12/2020 |
| CN | 113109801 | A | 7/2021 |

OTHER PUBLICATIONS

English translation of CN211062146U, Wu, 2020 (Year: 2020).*

First Office Action issued on Oct. 31, 2024, for application No. CN202180002598.6 with English translation attached.

Second Office Action (OA2) issued Mar. 13, 2025, of CN application corresponding to the captioned application with English translation.

* cited by examiner

EYESIGHT PROTECTION DEVICE, EYESIGHT PROTECTION SYSTEM AND DETECTION METHOD FOR EYESIGHT PROTECTION DEVICE

This is a National Phase Application filed under 35 U.S.C. 371 as a national stage of PCT/CN2021/119018, filed Sep. 17, 2021, the content of which is hereby incorporated by reference in its entirety.

TECHNICAL FIELD

The present disclosure relates to the technical field of communication, and in particular to, an eyesight protection device, an eyesight protection system and a detection method for the eyesight protection device.

BACKGROUND

At present, the myopia rate in China ranks second in the world. According to statistics, the myopia rate of primary school students in China is up to 34.17%, the myopia rate of middle school students is up to 56.59%, and the myopia rate of university graduates is up to 73.9%. The eyesight problem of teenagers is more and more severe. There are many reasons for myopia of students, and an important reason is incorrect writing and reading postures.

The millimeter-wave radar detection devices in the current market mainly include an eyesight protection lamp, a desk with a specific structure, eyesight protection glasses and the like. Although the devices can protect eyesight to a certain extent, but cannot solve the problem of myopia caused by incorrect writing and reading postures. The millimeter-wave radar detection devices are only applied in single application scene such as schools and family study rooms.

SUMMARY

The present invention intends to solve at least one of the technical problems existing in the prior art, provides an eyesight protection device, an eyesight protection system and a detection method for the eyesight protection device.

As a first aspect, the present disclosure provides an eyesight protection device, comprising a millimeter-wave radar detection circuit, a control circuit and an alarm circuit. The millimeter-wave radar detection circuit is configured to detect a distance between a user and a reading material read by the user, the control circuit is configured to generate a first control signal at least when it is determined that the distance detected by the millimeter-wave radar detection circuit is smaller than a first predetermined value, and the alarm circuit is configured to send out an alarm signal in response to the first control signal.

The control circuit is configured to generate the first control signal when it is determined that a duration, during which the distance detected by the millimeter-wave radar detection circuit is less than the first predetermined value, is greater than a second predetermined value.

The eyesight protection device further includes an accelerometer. The accelerometer includes an acceleration detection circuit and a frequency conversion circuit. The acceleration detection circuit is configured to detect an acceleration of the reading material, the control circuit is configured to generate a second control signal when it is determined that the acceleration detected by the acceleration detection circuit is smaller than a third predetermined value, and the frequency conversion circuit is configured to change a frequency at which the acceleration detection circuit detects the acceleration in response to the second control signal.

The accelerometer is communicatively coupled to the control circuit via an $I^2C$ interface.

The eyesight protection device further includes a storage circuit configured to store firmware data of the control circuit and the distance detected by the millimeter-wave radar detection circuit.

The storage circuit includes a first flash and a second flash. The first flash is configured to store the firmware data of the control circuit, and the second flash is configured to store the distance detected by the millimeter-wave radar detection circuit.

The storage circuit is communicatively coupled to the control circuit via a QSPI interface.

The eyesight protection device further includes a first power circuit configured to provide power to the eyesight protection device. The first power circuit further comprises a first power sub-circuit and/or a second power sub-circuit, the first power sub-circuit is configured to supply power to the control circuit, and the second power sub-circuit is configured to supply power to the first power sub-circuit and the control circuit.

The first power sub-circuit is configured to be communicatively coupled to the control circuit via a PMU interface, and the second power sub-circuit is communicatively coupled to the control circuit via a VBUS interface.

The eyesight protection device further includes a USB circuit and a Bluetooth circuit. The eyesight protection device is communicatively coupled to a user terminal via the USB circuit and the Bluetooth circuit, such that data including the distance is transmitted from the eyesight protection device to the user terminal.

The eyesight protection device further includes a WIFI circuit and a mobile communication circuit. The eyesight protection device is communicatively coupled to a network device via the WIFI circuit and the 4G circuit, such that data is transmitted between the network device and the eyesight protection device.

The eyesight protection device further includes a gyroscope configured to detect angle information of the millimeter-wave radar detection circuit. The control unit is configured to change an operation state of the eyesight protection device when it is determined that the angle information and the acceleration are not zero.

The gyroscope is communicatively coupled to the control circuit via an SPI interface or an I2C interface.

The alarm circuit comprises a buzzer communicatively coupled to the control circuit.

As a second aspect, an eyesight protection system is provided. The eyesight protection system includes the eyesight protection device described above and a user terminal. The eyesight protection device is configured to detect data of the user, the user terminal is configured to display the data of the user on the user terminal, and the eyesight protection device is communicatively coupled to the user terminal.

The eyesight protection system further includes a network device configured to: be communicatively coupled to a plurality of eyesight protection devices for a plurality of the users; and store and analyze the data of the plurality of the users.

As a third aspect, a detection method for an eyesight protection device is provide. The detection method includes receiving a distance between a user and a reading material read by the user and detected by a millimeter-wave radar detection circuit; generating a first control signal, at least when it is determined that the distance detected by the millimeter-wave radar detection circuit is smaller than a first predetermined value; and sending the first control signal to an alarm circuit so that the alarm circuit sends out an alarm signal.

The detection method further includes detecting, by an acceleration detection circuit, an acceleration of the eyesight protection device; generating a second control signal, when it is determined that the acceleration detected by the acceleration detection circuit is smaller than a third predetermined value, and changing, by a frequency conversion circuit, a frequency at which the acceleration detection circuit detects the acceleration in response to the second control signal received by the frequency conversion circuit.

Detecting, by the millimeter-wave radar detection circuit, the distance between the user and the reading material read by the user, includes acquiring a data value by processing original data detected by the millimeter-wave radar detection circuit, and generating the distance by classifying and filtering the data value.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denotes the presence of at least one element. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

The present invention intends solve some problems in the prior art, provides an eyesight protection device 02.

Figure 1:
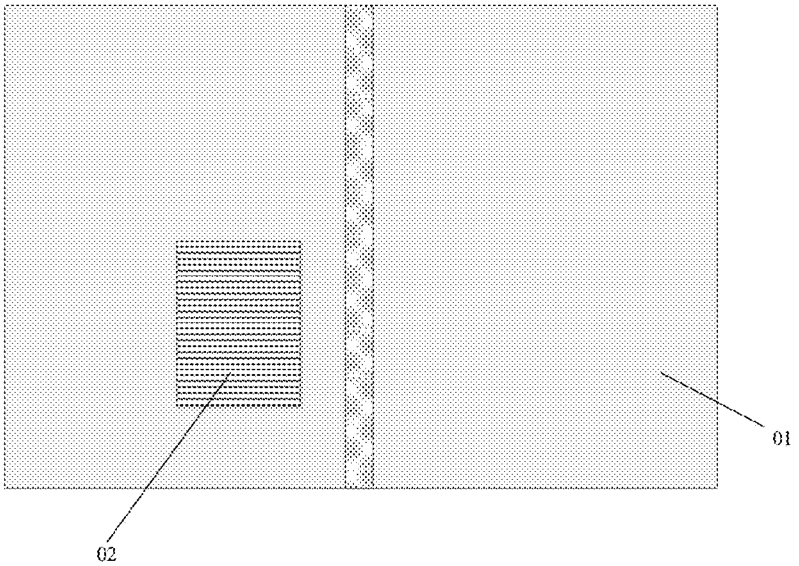
FIG. 1 is a schematic diagram showing an eyesight protection device on a reading material according to the present disclosure.
Figure 2:
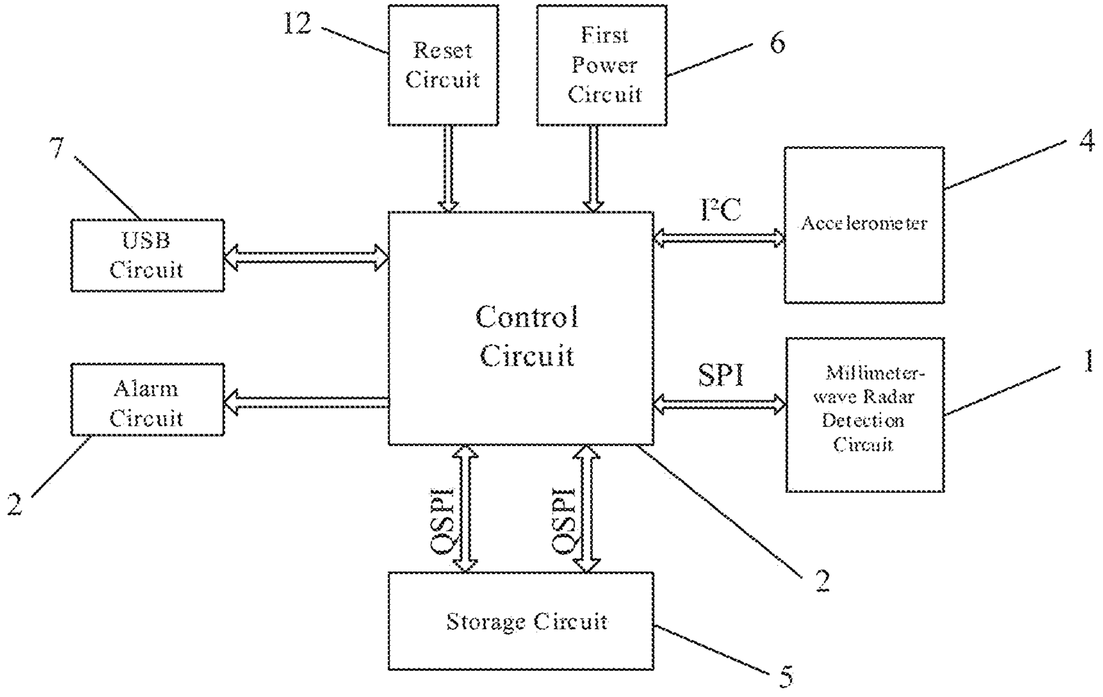
FIG. 2 is a schematic diagram showing communication connections among circuits in an eyesight protection device in an embodiment of the present disclosure.

As a first aspect, the present invention provides an eyesight protection device 02. As shown in FIGS. 1 and 2, the eyesight protection device 02 includes a millimeter-wave radar detection circuit 1, a control circuit 2, and an alarm circuit 3. The millimeter-wave radar detection circuit 1 is configured to detect a distance between a user and a reading material 01 read by the user. The control circuit 2 is configured to generate a first control signal, at least when it is determined that the distance detected by the millimeter-wave radar detection circuit 1 is smaller than a first predetermined value. The alarm circuit 3 is configured to send out an alarm signal in response to the first control signal.

In some embodiments, as shown in FIG. 1, the millimeter-wave radar detection circuit 1 is light in weight, therefore the eyesight protection device 02 including the millimeter-wave radar detection circuit 1 may be formed as a sticker structure. In the embodiment, a user of the eyesight protection device 02 with the sticker structure is a student, and the eyesight protection device 02 with the millimeter-wave radar detection circuit 21 is attached on the reading material (book) of the student. Thus, when the student reads the reading material, the millimeter-wave radar detection circuit 1 detects a distance between the student and the reading material read by the student. The control circuit 2 includes, but is not limited to, a field programmable gate array (FPGA), a central processing unit (CPU), and a micro-controller unit (MCU). In an embodiment, the MCU serves as the control circuit 2. When it is determined that the distance between the student and the reading material is smaller than the first predetermined value, the MCU generates the first control signal, which is a high-level signal or a low-level signal. The alarm circuit includes, but is not limited to, a buzzer, a signal lamp, and a vibration motor. In an embodiment, the alarm circuit is a buzzer. The alert signal includes, but is not limited to, sound, light and vibration, and the type of the alarm signal corresponds to the type of the alarm circuit. In the embodiment, the alarm signal is a sound signal when the alarm circuit is a buzzer. The buzzer makes a sound in response to the first control signal, so as to remind the student of over-close reading distance, therefore the student can adjust the distance between the student and the reading material, thereby achieving the effect of protecting the eyesight of the student.

Since the millimeter-wave radar detection circuit 1 is selected in the embodiment, the eyesight protection device 02 has a small volume and a light weight, and thus can be formed as the sticker structure through simple design. Therefore, the eyesight protection device 02 can be used anywhere and in any environments, for example, students can use it in schools, cafes, libraries, their own homes, and even in outdoor environments.

Figure 3:
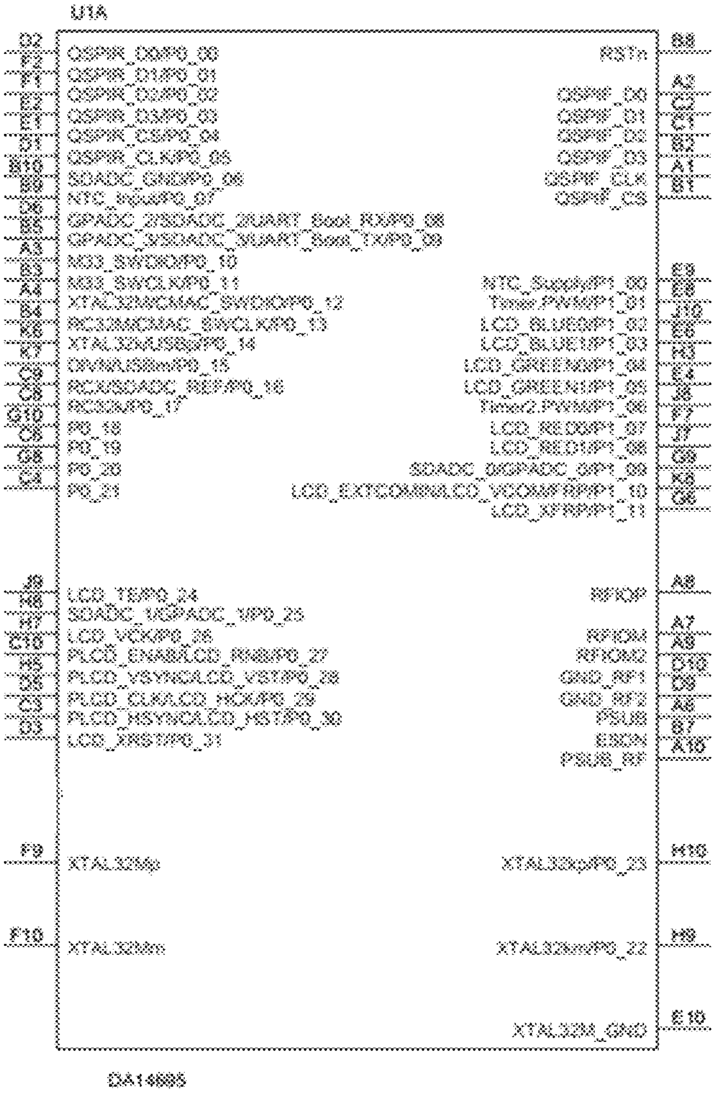
FIGS. 3 to 4 are schematic diagrams showing circuits of MCU in an embodiment of the present disclosure.
Figure 4:
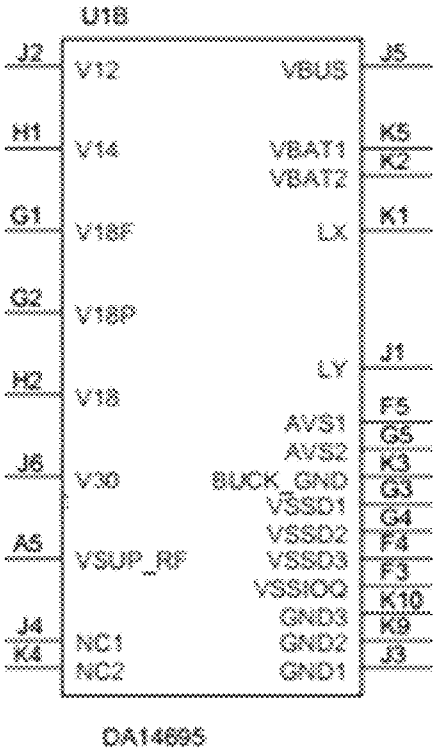

FIGS. 3 and 4 are schematic diagrams showing an exemplary MCU, and FIG. 3 shows a data circuit of the MCU for performing a data operation; FIG. 4 shows a power circuit of the MCU for receiving and transmitting power signals. In the data circuit, QSPIR_D0-QSPIR_D3, QSPIR_CS and QSPIR_CLK are a group of QSPI interfaces; QSPIF_D0-QSPIF_D3, QSPIF_CS and QSPIF_CLK are another group of QSPI interfaces; XTAL32M and RC32M are a group of data line interfaces; P0_25 to P0_31 are a group of $I^2C$ interfaces; P1_01 to P1_11W are a group of SPI interfaces; RFIOP is a Bluetooth antenna interface; RSTn is a reset interface; P0_21 is an alarm signal interface. In the power circuit, V12, V14, V18F, V18P, V18, V30 and VBUS are power interfaces.

In some embodiments, the millimeter-wave radar detection circuit 1 is configured to detect the distance between the user and the reading material 01 he or she is reading. The control circuit 2 is configured to generate a third control signal when it is determined that the distance detected by the millimeter-wave radar detection circuit 1 is greater than or equal to the first predetermined value. The alarm circuit 3 is configured to stop sending out the alarm signal in response to the third control signal.

In the embodiment, when the student is far away from the reading material, the millimeter-wave radar detection circuit 1 detects that the distance between the student and the reading material becomes large. When the MCU detects that the distance between the student and the reading material is larger than or equal to the first predetermined value, the MCU generates the third control signal, with the third control signal being a low-level signal or a high-level signal. The buzzer stops sounding in response to the third control signal to remind the student that the current reading distance is proper. In this way, when a student is reading, the student can determine whether the distance between the student and the reading material is proper or not according to whether the eyesight protection device 02 makes a sound or not. When a student uses the eyesight protection device 02 in the embodiment for a long time, it is helpful to develop the habit of reading a reading material at a distance farther than the first predetermined value, so as to form a reading habit that helps to protect the eyesight, and to achieve the effect of long-term eyesight protection.

In some embodiments, the control circuit 2 of the eyesight protection device 02 is specifically configured to generate the first control signal, when it is determined that a duration, during which the distance detected by the millimeter-wave radar detection circuit 1 is less than the first predetermined value, is greater than a second predetermined value. In the embodiment, the control circuit 2 (i.e. the MCU) detects a duration during which the student reads the reading material at an over-close distance between the student and the reading material. When the duration is greater than the second predetermined value, that is, when the duration during which the student reads the reading material at the over-close distance is greater than the second predetermined value, which means that the duration during which the student reads the reading material at the over-close distance is too long. At this time, the MCU generates first control information, and the buzzer makes a sound in response to the first control information, so as to remind the student that the distance between the student and the reading material is too close and the duration during which the student reads the reading material at the over-close distance between the student and the reading material is too long, please keep far away from the reading material, thereby realizing the effect of protecting the eyesight of the student.

In the embodiment, when the distance between the student and the reading material is smaller than the first predetermined value, and the duration, during which the distance detected by the MCU is less than the first predetermined value, is greater than the second predetermined value, the eyesight protection device 02 makes a sound, to remind the student of over-close reading distance. Therefore, the phenomenon can be avoided that the normal learning of students is influenced due to unnecessary reminding caused by the fact that the student reads the reading material temporarily at the over-close reading distance between the student and the reading material and caused by the errors existing in the eyesight protection device 02.

Figure 5:
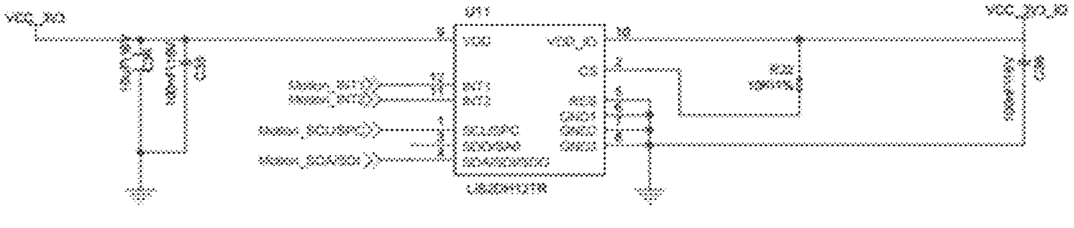
FIG. 5 is a schematic diagram showing a circuit of an accelerometer in an embodiment of the present disclosure.

In some embodiments, the eyesight protection device 02 further includes an accelerometer 4 as shown in FIG. 5. The accelerometer 4 includes an acceleration detection circuit and a frequency conversion circuit. The acceleration detection circuit of the accelerometer 4 is configured to detect an acceleration of the eyesight protection device 02 including the millimeter-wave radar detection circuit 1. The control circuit 2 is configured to generate a second control signal when it is determined that the acceleration detected by the acceleration detection circuit is smaller than a third predetermined value. The frequency conversion circuit is configured to change a frequency at which the acceleration detection circuit detects the acceleration in response to the second control signal. The eyesight protection device 02 changes its operation state in response to the change of the frequency at which the acceleration detection circuit detects the acceleration. In the embodiment, the accelerometer 4 is coupled to the MCU through an $I^2C$ interface, and the accelerometer is coupled to the MCU through INT1, INT2, SCL, and SDA interfaces. The power circuit of the MCU provides the power signal to the accelerometer 4 through the V30 interface. The acceleration detection circuit of the accelerometer 4 is configured to detect the acceleration of the millimeter-wave radar detection circuit 1, and send the detected acceleration to the MCU through the $I^2C$ interface, and the MCU processes the acceleration. The MCU generates the second control signal when it is determined that the acceleration detected by the acceleration detection circuit is less than the third predetermined value. The frequency conversion circuit changes the frequency at which the accelerometer 4 detects the acceleration according to the second control signal, and in turn changes the operation state of the eyesight protection device 02 including the millimeter-wave radar detection circuit 1. The operation state of the eyesight protection device 02 includes a normal operation state and a sleep state. When the eyesight protection device 02 is in the normal operation state, each of the circuits of the eyesight protection device 02 operates at a predetermined operation frequency and voltage, so as to realize detection and alarm of the distance between a student and a reading material read by the student. When the eyesight protection device 02 is in the sleep state, the control circuit 2 (i.e. the MCU) of the eyesight protection device 02 measures the acceleration by using the accelerometer 4 at a very low frequency. In this way, by measuring the acceleration, it is determined whether the eyesight protection device 02 is in the operation state or not, so that the eyesight protection device 02 enters the sleep state when it is determined that the eyesight protection device 02 is in a non-operation state, therefore the power consumption of the eyesight protection device 02 can be decreased, and the service time of the eyesight protection device 02 can be improved.

Specifically, the accelerometer 4 detects the acceleration of the reading material 01. Since the eyesight protection device 02 is formed on the reading material read by the student, the posture of the student cannot be a fixed posture and the reading material will generate some acceleration when the student reads the reading material. The accelerometer 4 collects the accelerations for determining. When the acceleration is obviously greater than the third predetermined value and the accumulated speed value fluctuates near the zero point, it is determined that a person is reading a reading material with the eyesight protection device 02. If the eyesight protection device is in the sleep state at the moment, the MCU converts the operation state of the eyesight protection device 02 from the sleep state to the operation state according to the current acceleration; if the eyesight protection device 02 is in the normal operation state, the MCU controls the operation state of the eyesight protection device 02 to be kept unchanged according to the current acceleration. When the acceleration collected by the accelerometer 4 is smaller than the third predetermined value and the accumulated speed value deviates from the zero point, it is determined that the reading material with the eyesight protection device 02 is not moved, and if the distance detected by the millimeter-wave radar detection circuit 1 and acquired by the MCU is zero, it is determined that no one is reading the reading material provided with the eyesight protection device 02. In this case, if the eyesight protection device 02 is in the normal operation state, the MCU changes the operation state of the eyesight protection device 02 from the normal operation state to the sleep state according to the current acceleration; and if the eyesight protection device 02 is in the sleep state at current, the MCU keeps the operation state of the eyesight protection device 02 unchanged according to the current acceleration. In the embodiment, the third predetermined value ranges from 0 to 1.24 $m/s^2$, and preferably, the third predetermined value is 0.64 $m/s^2$.

In some embodiments, the eyesight protection device 02 further includes a storage circuit 5, as shown in FIG. 2. The storage circuit 5 is configured to store the firmware data of the control circuit 2 and the distance detected by the millimeter-wave radar detection circuit 1. Specifically, since the control circuit 2 is an MCU in the embodiment, the storage circuit 5 at least stores the firmware information of the MCU for burning, configuring, and supporting the normal operation of the MCU. The data detected by the millimeter-wave radar detection circuit 1 in the embodiment at least includes the distance. The distance measured by the millimeter-wave radar detection circuit 1 under the control of the MCU is stored in the storage circuit 5. In this way, more distances measured by the millimeter-wave radar detection circuit 1 can be stored, which is conducive to subsequent processing and analysis of the distances.

Figure 6:
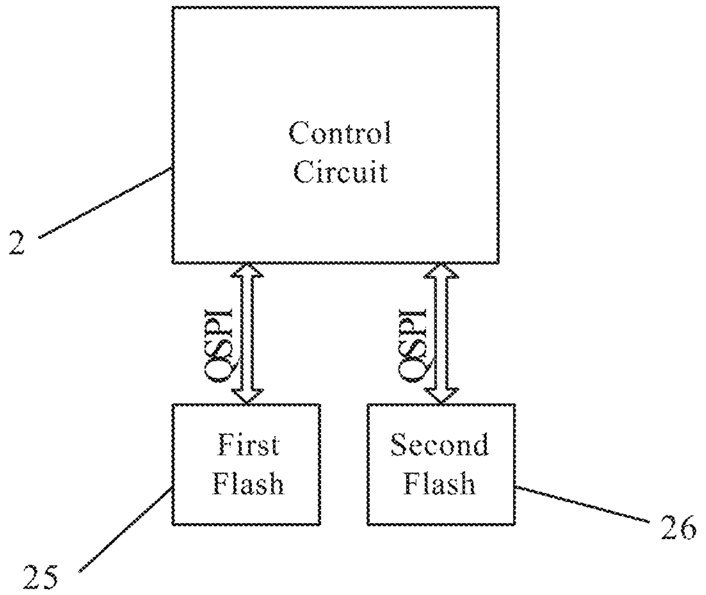
FIG. 6 is a schematic diagram showing a communication connection between a storage circuit and a control circuit in an embodiment of the present disclosure.
Figure 7:
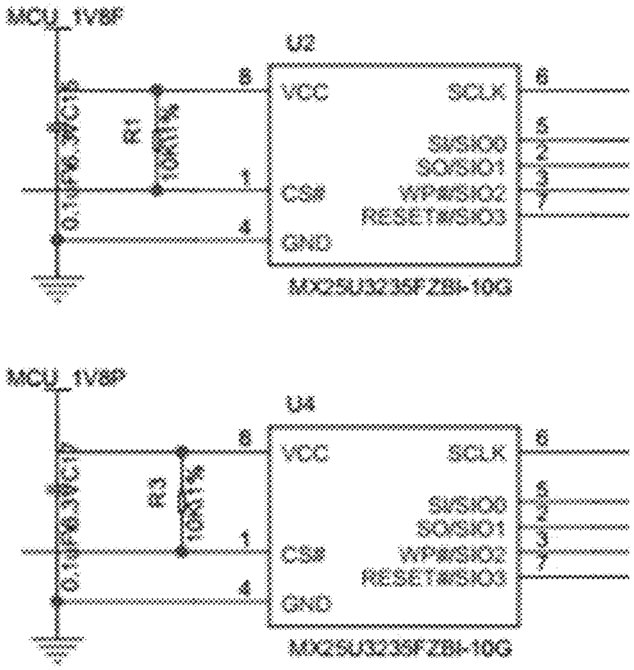
FIG. 7 is a circuit diagram showing a first storage sub-circuit and a second storage sub-circuit in an embodiment of the present disclosure.

In some embodiments, the storage circuit 5 includes a first flash 25 and a second flash 26. FIGS. 6 to 7 are schematic diagrams showing the first flash 25 and the second flash 26. The first flash 25 is configured to store firmware information of the MCU, and the second storage circuit 5 is configured to store the distance detected by the millimeter-wave radar detection circuit 1. The first flash 25 and the second flash 26 are in communication connection with the MCU through a QSPI protocol. In the embodiment, the first flash 25 and the second flash 26 have the same structure, and SIO0-SIO3 and SCLK are in communication connection with the MCU. In this way, the firmware information of the MCU and the distance detected by the millimeter-wave radar detection circuit 1 are saved respectively. On one hand, it is beneficial to data management, and on the other hand, a flash chip with a moderate storage space can be selected for storage according to the actual needs of the firmware information and the distance, which saves the storage space and the cost compared to a case of using only one flash chip. In the embodiment, the first flash 25 includes a first flash chip and a peripheral circuit matched with the first flash chip; the second flash circuit 26 includes a second flash chip and a peripheral circuit matched with the second flash chip. Each of the first flash chip and the second flash chip has a storage space of 32 Mbit to 256 Mbit.

In some embodiments, as shown in FIG. 2, the eyesight protection device 02 further includes a first power circuit 6 configured to supply power to the eyesight protection device 02. In this way, the power is provided to the eyesight protection device 02. Specifically, the first power circuit 6 supplies power to the MCU, and the first power circuit 6 is in communication connection with the MCU via a PMU interface. The MCU in the embodiment is provided with a power management system, so that the power can be supplied to the circuits coupled to the MCU. In the embodiment, the MCU receives the power supplied from the first power circuit 6 and supplies power signals to the circuits including, but not limited to, the storage circuit 5, the millimeter-wave radar detection circuit 1, and the accelerometer 4 via its power interfaces. In this way, the storage circuit 5, the millimeter-wave radar detection circuit 1 and the accelerometer 4 can be powered in a convenient manner. Further, according to the needs of the storage circuit 5, the millimeter-wave radar detection circuit 1 and the accelerometer 4, respectively, the peripheral circuit is arranged between the MCU and the above circuits and/or the MCU is programmed to provide power to those circuits. The peripheral circuit includes, but is not limited to, a OR resistor, inductive magnetic beads, a capacitor, an overvoltage protection circuit, an electrostatic protection circuit, and a voltage conversion circuit.

In some embodiments, the first power circuit 6 further includes a first power sub-circuit and/or a second power sub-circuit. In an embodiment, the first power circuit 6 includes both of the first power sub-circuit and the second power sub-circuit. The first power sub-circuit is configured to supply power to the MCU, and the second power sub-circuit is configured to supply power to the first power sub-system and the MCU. The first power sub-circuit is configured to be in communication connection with the control circuit 2 via a PMU interface, and the second power sub-circuit is configured to be in communication connection with the control circuit 2 via a VBUS interface. Specifically, the first power sub-circuit at least includes a lithium battery which is a rechargeable battery. In the embodiment, the lithium battery at least supplies power to the eyesight protection device 02. In this way, the lithium battery is safe and has a big energy storage density, the lithium battery supplies power to the eyesight protection device 02, so that the eyesight protection device 02 is very portable to use without external power lines, and the eyesight protection device 02 has a longer standby time and can be charged, which is more in line with the usage habits of the current consumer groups. The second power sub-circuit includes a USB2.0 interface through which the lithium battery and the control unit are powered and through which some processed information in the MCU can be exported out. For example, when the eyesight protection device 02 is charged by a computer, the data processed and stored by the MCU in the eyesight protection device 02 can be exported into the computer through the USB2.0 interface, and some data of the student who uses the eyesight protection device 02 for a period of time can be obtained by processing the data with some specific software installed on the computer. By analyzing and processing the data, analysis of the reading habits of the student can be obtained, and parents and teachers can adjust the reading habits of the student through the analysis of the reading habits, so as to realize the effect of protecting the eyesight of the student. In this way, when the above-mentioned lithium battery has an insufficient power, the lithium battery can be charged, and at the same time the control unit can be powered, so that the eyesight protection device 02 can be normally used while the eyesight protection device 02 is charged via the power line when the built-in lithium battery has an insufficient power. Further, in this way, the circuit has a simple structure, a low cost, and a high reliability.

In some embodiments, the second power sub-circuit may further include a wireless charging circuit. In this way, the lithium battery and the control unit 2 can be powered through the wireless charging, so that the eyesight protection device 02 can be charged in a more convenient way.

Figure 8:
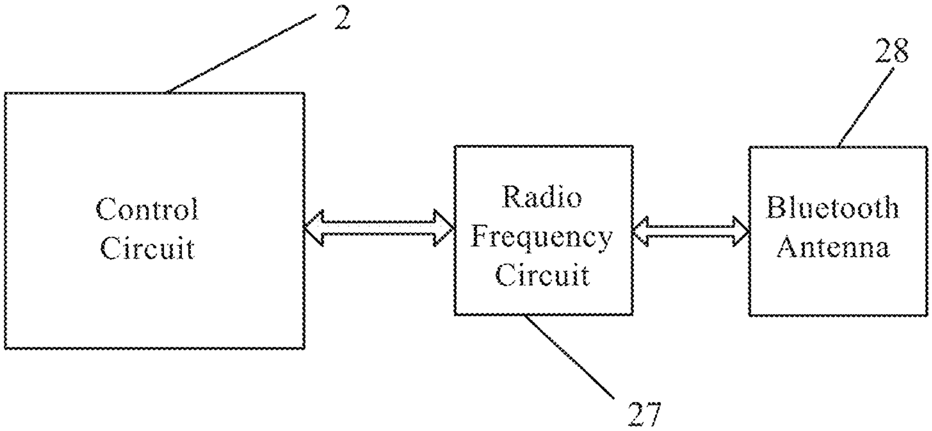
FIG. 8 is a schematic diagram showing a communication connection of a Bluetooth circuit in the present application.
Figure 9:
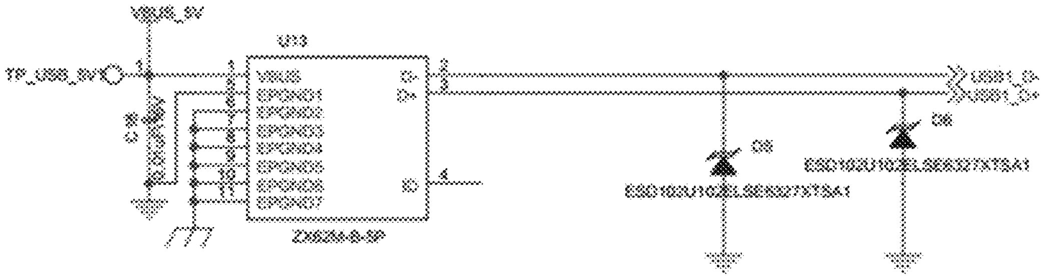
FIG. 9 is a circuit diagram showing a USB circuit in the present application.
Figure 10:
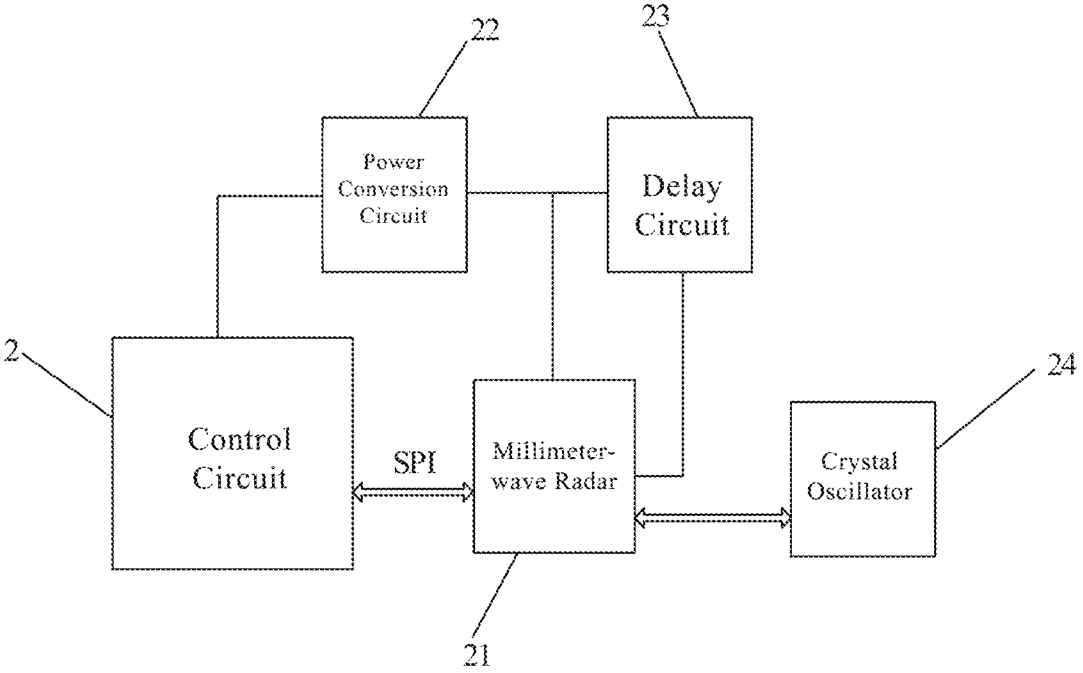
FIG. 10 is a schematic diagram showing a communication connection of a millimeter-wave radar detection circuit in the present application.

In some embodiments, as shown in FIGS. 8 and 9, the eyesight protection device 02 further includes: a USB circuit 7 and a Bluetooth circuit 8. The eyesight protection device 02 is communicatively coupled to the user terminal 10 through the USB circuit 7 and the Bluetooth circuit 8, so that data of the eyesight protection device 02 is transmitted to the user terminal 10, the data at least including the distance. In the embodiment, the USB circuit 7 at least includes a USB interface, and the eyesight protection device 02 is communicatively coupled to the user terminal 10 through a data line coupled to the USB interface and the data is transmitted between the eyesight protection device 02 and the user terminal 10. The USB interface is configured to physically connect the data line to the communication device and the eyesight protection device 02. In the embodiment, the USB interface in the USB circuit 7 of the eyesight protection device 02 may be the same interface as the USB2.0 interface in the second power sub-system. In this way, the integration degree of the eyesight protection device 02 can be improved, so that the eyesight protection device 02 is more compact and portable. And further, the material cost of the eyesight protection device 02 can be reduced.

In the embodiment, as shown in FIG. 8, the Bluetooth circuit 8 includes a Bluetooth antenna 28 and a radio frequency circuit 27 matched with the Bluetooth antenna 28. In this way, the eyesight protection device 02 can be communicatively coupled to a user terminal with Bluetooth function through Bluetooth. In this way, the eyesight protection device 02 can wirelessly communicate with the user terminal through Bluetooth, so that the communication connection between the eyesight protection device 02 and the user terminal is more convenient. The Bluetooth function is widely applied to various user terminals, that is, the wireless communication between the user terminal and the eyesight protection device 02 can be realized without an additional communication circuit in the user terminal. The learning cost and the use habit of the user can be reduced.

Further in the embodiment, the data in the eyesight protection device 02 is transmitted to the user terminal 10 through the communication connection between the user terminal and the eyesight protection device 02. The user terminal is any one of a mobile phone, a computer and a tablet personal computer, and a user of the user terminal is a teacher or a parent. In this way, the mobile phone or computer communicates with the eyesight protection device 02 by the teacher or the parent, so that the reading distance of the student stored in the eyesight protection device 02 is uploaded to the computer or mobile phone of the teacher or the parent. A specific data analysis software is installed on the teacher's or parent's mobile phone or computer. The reading habit of the student can be obtained by analyzing and processing the reading distance of the student in the eyesight protection device 02 through the software. The teacher or the parent can correct the student's reading habits, thereby realizing the effect of protecting eyesight of the student.

In some embodiments, the eyesight protection device 02 further includes a WIFI circuit 33 and a mobile communication circuit 34. The WIFI circuit 33 and the mobile communication circuit 34 are configured to communicatively connect the eyesight protection device 02 to a network device. Data is transmitted between the network device and the eyesight protection device 02. In the embodiment, the network device includes a device having an internet information interaction function. On one hand, the network device may include the user terminal 10 used by a teacher or a parent, such as a mobile phone, a computer, or a tablet computer; on the other hand the network device may further include a background terminal on the cloud platform. In this way, the communication range of the eyesight protection device 02 can be broadened. If the user terminal 10 and the eyesight protection device 02 only communicate with each other via Bluetooth, a short-range communication within several tens of meters may be only performed due to the property of the Bluetooth antenna 28 itself, so that the parent or teacher cannot remotely obtain information in the eyesight protection device 02. With the eyesight protection device 02 having the WIFI circuit 33 and/or the mobile communication circuit 34, the remote distance communication between the eyesight protection device 02 and the user terminal 10 can be realized. Meanwhile, the WIFI circuit 33 and the mobile communication circuit 34 are widely applied in the user terminal, therefore the wireless communication between the user terminal and the eyesight protection device 02 can be realized without additional communication circuits in the user terminal. The learning cost and the use habit of the user can be reduced.

In addition, the network device 11 further includes a background terminal on the cloud platform. The background terminal can be communicatively coupled to a plurality of the eyesight protection devices 02, and therefore data in the plurality of the eyesight protection devices 02 can be collected. Specifically, a school can collect data in the eyesight protection devices 02 for all students in the school through only one background terminal, with the data at least including the distance. Therefore, the school can analyze the reading distances of all the students in the school according to the collected data, so as to obtain the reading habits of all the students in the school. The analysis of the reading habits of all the students in the school helps teachers in the school and parents to correct students' reading habits, thereby realizing the effect of protecting students' eyesight.

In some embodiments, FIGS. 10 to 13 are schematic diagrams showing a millimeter-wave detection circuit in the present disclosure. The millimeter-wave radar detection circuit 1 in the eyesight protection device 02 includes a millimeter-wave radar 21 and peripheral circuits supporting the operation of the millimeter-wave radar detection circuit 1. Specifically, the millimeter-wave radar 21 is small in volume and light in weight, the millimeter-wave eyesight protection device 02 can be formed as a sticker structure. Meanwhile, the millimeter-wave radar 21 measures the distance between the student and the reading material read by the student based on the time-of-flight principle. Specifically, by transmitting a plurality of pulses one after the other in short time intervals, the plurality of pulses are reflected by the object and collected by a detector. The distance between the student and the reading material being read by the student can be obtained by calculating a timing at which a pulse is transmitted and a timing at which the pulse is received, thereby realizing the technical effect such as low power consumption, continuity of test results, and the measured distance with a millimeter-level accuracy.

In the embodiment, the frequency of the millimeter-wave radar 21 can be set so that the distance between the student and the reading material read by the student can be accurately measured when the eyesight protection device 02 is covered by the reading material. Since objects with different dielectric constants will cause the difference in reflection and transmission of millimeter-wave signals, the reflection and transmission of the millimeter-wave signals with different frequencies to people and reading material are different. In the embodiment, the frequency of the millimeter-wave radar 21 should be set such that the millimeter-wave signals can just penetrate the reading material to which the millimeter-wave radar 21 is attached and be reflected at a location of the student. In the embodiment, in order to satisfy above condition, the frequency of the millimeter-wave radar 21 is set in a range from 50 GHz to 70 GHz.

Figure 11:
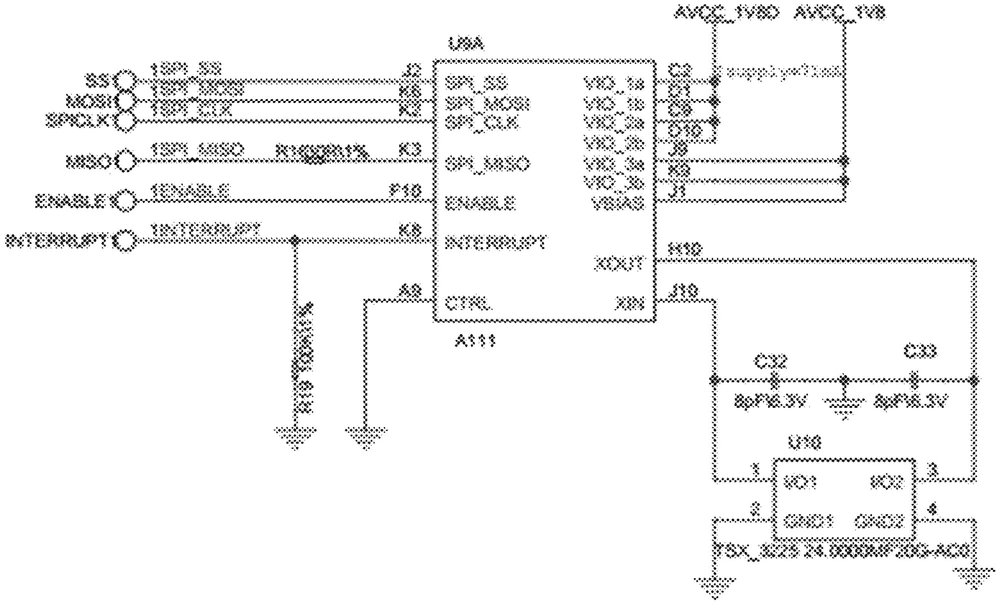
FIG. 11 is a circuit diagram showing a millimeter-wave radar in the present application.
Figure 12:
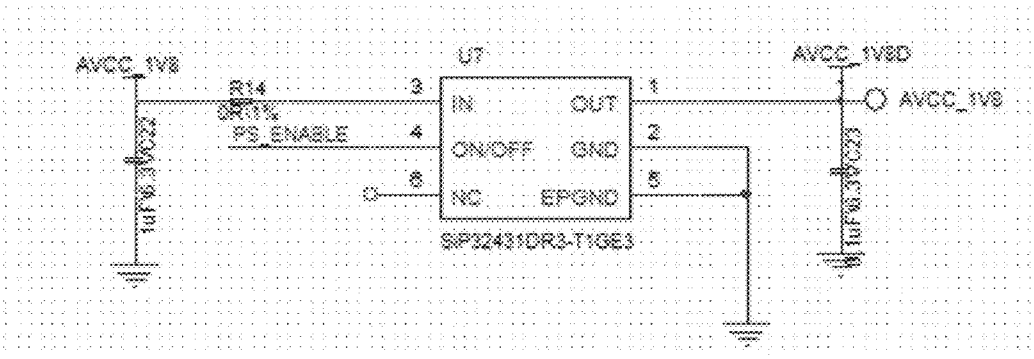
FIG. 12 is a circuit diagram showing a delay circuit in the present application.
Figure 13:
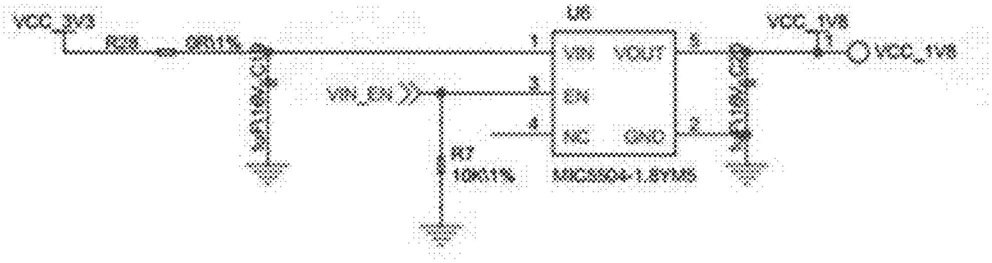
FIG. 13 is a circuit diagram showing a power conversion circuit in the present application.

In the embodiment, in order for the millimeter-wave radar 21 to satisfy its operation state, the peripheral circuits include a crystal oscillator 24, a power conversion circuit 22, and a delay circuit 23. The crystal oscillator 24 is configured to provide a clock signal to the millimeter-wave radar 21 so that the millimeter-wave radar 21 has an operation clock. The voltage conversion circuit is configured to convert a power signal provided from the MCU into a power signal required by the millimeter-wave radar 21, so that the power signal of the millimeter-wave radar 21 is more pure and stable. In the embodiment, the power signal provided from the MCU is 3.3V, the power signal required by the millimeter-wave radar 21 is 1.8V, and the power conversion circuit 22 converts the power signal of 3.3V provided from the MCU into the power signal of 1.8V. The delay module 23 is configured to give priority to the power supply of some ports of the millimeter wave radar 21 that require high requirement for the power signals. Specifically, FIG. 11 is a schematic diagram showing a connection between the millimeter-wave radar and the crystal oscillator. The crystal oscillator 24 is communicatively coupled to XOUT and XIN interfaces of the millimeter-wave radar 21. FIG. 13 is a schematic diagram showing a power conversion circuit 22. One terminal of the power conversion circuit is communicatively coupled to a terminal V30 of the MCU, the other terminal of the power conversion circuit is communicatively coupled to power interfaces of the millimeter-wave radar 21, and VIO_1*a* to VIO_3*b* and VBIAS are the power interfaces of the millimeter-wave radar. The power ports of the millimeter-wave radar 21 include a first power port and a second power port. The first power port has a higher requirement on power signals and needs to be supplied with power preferentially, therefore the first power port is directly communicatively coupled to the power conversion circuit 22. The second power port is communicatively coupled to the delay circuit 23, and the delay circuit 23 is communicatively coupled to the power conversion circuit 22. The delay circuit 23 supplies the power to the second power port with delay, so that the first power port is preferentially powered, and the millimeter-wave radar 21 operates normally. Specifically, the first power port includes VIO_3*a* and VIO_3*b*, and the second power port includes VIO_1*a* to VIO_2*b*. In the embodiment, the millimeter-wave radar 21 is communicatively coupled to the MCU via an SPI interface, and the SPI_SS, the SPI_MOSI, and the SPI_CLK are SPI interfaces of the millimeter-wave radar.

Figure 14:
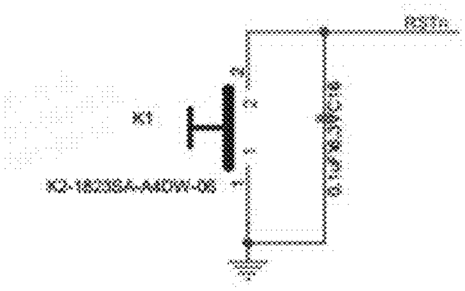
FIG. 14 is a circuit diagram showing a reset circuit in the present application.

In some embodiments, as shown in FIG. 14, the eyesight protection device 02 further includes a reset circuit 12 configured to reset the MCU. Specifically, the reset circuit 12 includes a reset switch and a reset sub-circuit. The reset switch includes a reset button K1, with one terminal of the reset button K1 being coupled to a reset port of the MCU and the other terminal of the reset button K1 being grounded. The reset sub-circuit is coupled to the reset button in parallel and is configured to prevent the reset button from shaking. When the reset button is pressed down, the reset port of the MCU is grounded and written with a low-level signal therein, so as to reset the MCU.

Figure 15:
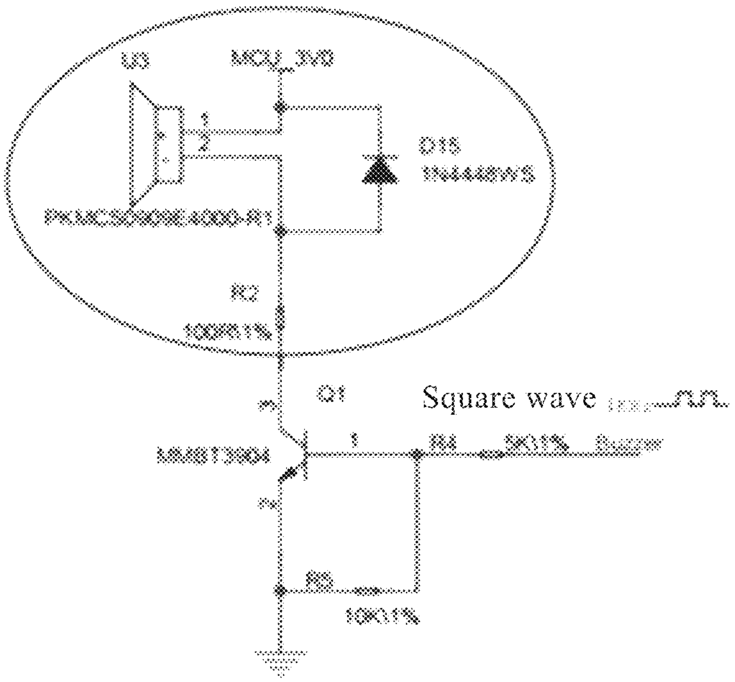
FIG. 15 is a circuit diagram showing an alarm circuit in the present application.

In some embodiments, as shown in FIG. 15, the alarm circuit includes a buzzer and an alarm sub-circuit. One terminal of the buzzer is electrically coupled to a port V30 of the MCU, and the other terminal of the buzzer is electrically coupled to one terminal of the alarm sub-circuit. The alarm sub-circuit includes a switch transistor, with a control terminal of the switch transistor being communicatively coupled to an alarm signal interface P0_21.

In some embodiments, the eyesight protection device 02 further includes a gyroscope 9 configured to detect angle information of the millimeter-wave radar detection circuit 1. The control unit is configured to change the operation state of the millimeter-wave radar 21 in response to both of the angle information and the acceleration being not zero. Specifically, since the gyroscope 9 may detect the angle information of the eyesight protection device 02, the MCU may further detect the operation state of the eyesight protection device 02 according to both of the angle information and acceleration, and in turn change the operation state of the eyesight protection device 02. In this way, the detection of the operation state is more accurate, and the power consumption of the eyesight protection device 02 can be reduced. The operation state includes the normal operation state and the sleep state described above, which are the same as those described in the embodiments described above, and the steps of switching the operation states are the same as above steps of changing the operation states according to the acceleration, and will not be described here again.

In some embodiments, the eyesight protection device 02 also includes a base to fix the eyesight protection device. The base may include a third power sub-circuit and a data communication circuit. The third power sub-circuit is configured to supply power to the lithium battery and the control circuit 2. The eyesight protection device is communicatively coupled to the user terminal through the data communication circuit, and the data is transmitted from the eyesight protection device to the user terminal, thereby realizing a more convenient usage of the eyesight protection device.

Figure 16:
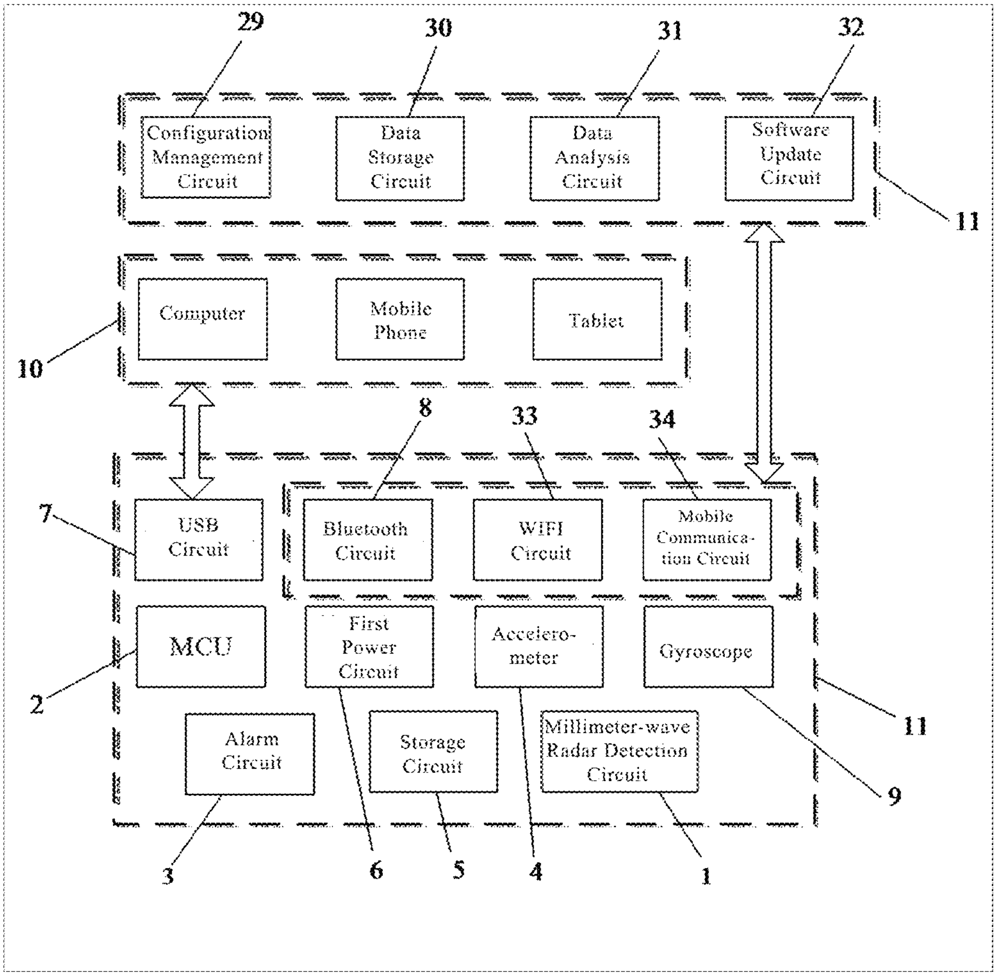
FIG. 16 is a schematic diagram showing an eyesight protection system in the present application.
Figure 17:
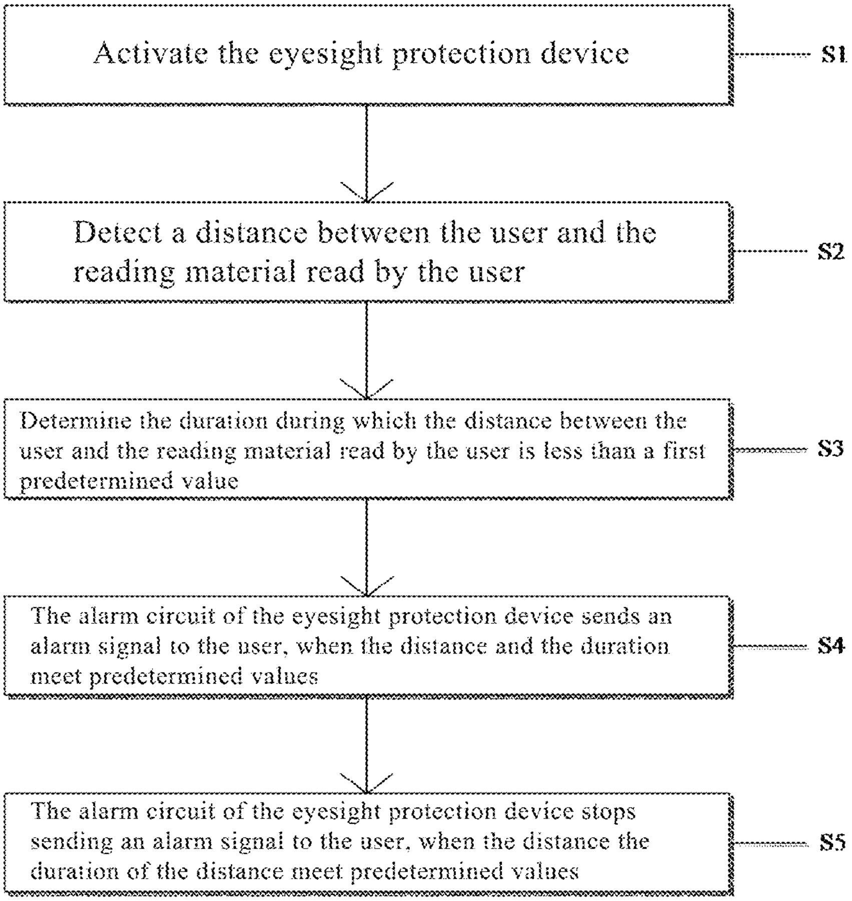
FIG. 17 is a schematic diagram showing steps S1 to S5 in the present application.

As a second aspect, as shown in FIG. 16, an embodiment in the present application further provides an eyesight protection system including the eyesight protection device 02 and the user terminal 10. The eyesight protection device 02 is configured to detect the data of the user. The user terminal 10 is configured to display the data of the user on the user terminal 10. The eyesight protection device 02 may be communicatively coupled to the user terminal 10. Specifically, the above data includes, but is not limited to, personal information of the user, the duration of the user reading the reading material, a distance between the user and the reading material when the user is reading the reading material, etc. The user is a student, and the user terminal 10 includes, but is not limited to, a mobile phone, a computer or a tablet computer. A user of the user terminal includes, but is not limited to, parents or the teacher of the student. In this way, a teacher and parents may upload the data stored in the eyesight protection device 02 to a computer or a mobile phone of the teacher or the parents through their mobile phone or the computer. A specific data analysis software is installed in the mobile phone or the computer of the teacher or the parents. The data obtained when the student is reading a reading material having the eyesight protection device 02 are analyzed and processed through the data analysis software, the processed information is displayed graphically on a screen of the mobile phone or the computer. By graphically displaying the reading data of students on the screen of the mobile phone or computer, the students' reading habits can be clearly understood by the teachers and parents, and teachers and parents can correct the students' reading habits according to the graphical reading habits of the students, so as to realize the effect of protecting students' eyesight.

In some embodiments, the eyesight protection system further includes a network terminal 11 configured to be communicatively coupled to the plurality of eyesight protection devices 02, and to store and analyze the data of the users in the plurality of eyesight protection devices 02. Specifically, the network terminal 11 includes: a configuration management circuit 29, a data storage circuit 305, a data analysis circuit 31, and a software update circuit 32. The configuration management circuit 29 is configured to configure and manage the network terminal 11. The data storage circuit 5 is configured to store programs in the network terminal 11 and the data of users for the plurality of eyesight protection devices 02. The data analysis circuit 31 is configured to perform statistics and analysis on the data of the users for the plurality of eyesight protection devices 02, and form the statistical results into visual data. The software update circuit 32 is configured to detect the version information of the programs in the eyesight protection devices 02 communicatively coupled to the network terminal 11 and update the programs in the eyesight protection devices 02.

In this way, unified management of the plurality of eyesight protection devices 02 can be realized. On the one hand, the programs in the eyesight protection devices 02 can be managed in a unified version and upgraded, so that the programs in the eyesight protection devices 02 can be continuously improved; on the other hand, when the above-mentioned network device is a background terminal of a school, the school can collect the data of all the eyesight protection devices 02 in the whole school through the background terminal, and the data at least includes the distance. Therefore, the school can perform statistics and analysis on the reading habits of all the students in the school by analyzing the data of the students stored in the background terminal, which helps teachers in the school and parents to correct students' reading habits, thereby realizing the effect of protecting students' eyesight.

As a third aspect, as shown in FIGS. 17 to 20, an embodiment of the present application further provides a detection method for the eyesight protection device 02, which includes receiving a distance, between a user and a reading material 01 read by the user, detected by the millimeter-wave radar detection circuit 1; generating a first control signal at least when it is determined that the distance detected by the millimeter-wave radar detection circuit 1 is smaller than a first predetermined value; and sending the first control signal to an alarm circuit 3 so that the alarm circuit 3 sends out an alarm signal.

In the embodiment, the eyesight protection device 02 includes a millimeter-wave radar detection circuit 1 configured to detect a distance between a user and a reading material 01 read by the user. The eyesight protection device 02 further includes a control unit including but not limited to, a field programmable gate array (FPGA), a central processing unit (CPU), a microcontroller unit (MCU). In the embodiment, an MCU serves as the control circuit 2. When it is determined that the distance detected by the millimeter-wave detection device is smaller than a first predetermined distance value, an alarm circuit of the eyesight protection device 02 sends an alarm signal to the user. In the embodiment, the alarm circuit includes a buzzer, and the alarm signal is a sound signal.

Specifically, as shown in FIGS. 17 to 20, the method for eyesight protection in the embodiment of the present application will be specifically described below.

At step S1, the eyesight protection device 02 is activated.

Specifically, a power switch of the eyesight protection device 02 is turned on to provide a power signal to the circuits of the eyesight protection device 02 such as an MCU. Meanwhile, the MCU detects and records the device state information of the eyesight protection device 02. The above-mentioned device state information includes, but is not limited to, the operation state of the millimeter-wave radar 21 of the eyesight protection device 02, a millimeter-wave collection state of the millimeter-wave radar 21 of the millimeter-wave radar detection circuit 1, and a state of the first power circuit 6 of the eyesight protection device 02. If the device state information described above is abnormal, a corresponding alarm signal is sent to the user, and the problem report is uploaded to the network terminal 11 and the user terminal 10 which are in communication connection with the eyesight protection device 02.

Figure 18:
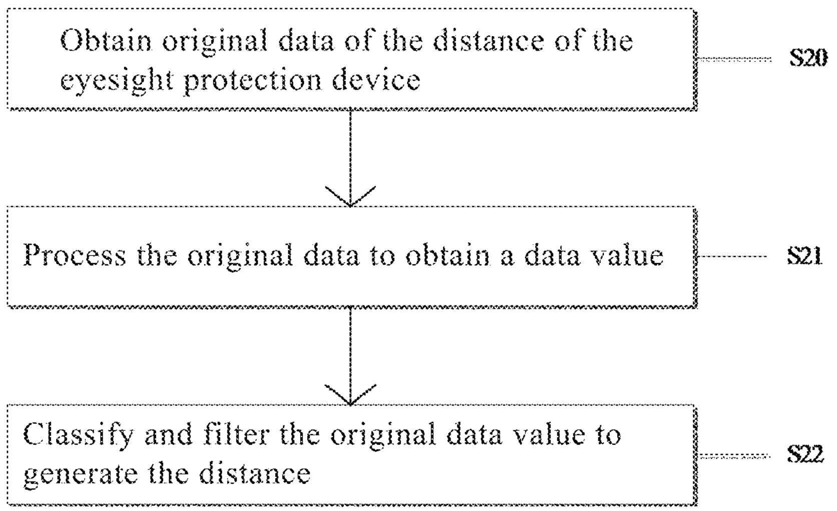
FIG. 18 is a schematic diagram showing steps S20 to S22 in the present application.

At step S2, a distance between the user and the reading material 01 read by the user is detected. The millimeter-wave radar 21 acquires data within a distance ranging from 15 cm to 60 cm. Data regarding the distance that is too close and too far is meaningless, since the millimeter-wave radar 21 measures the distance between the user and the reading material 01. In the embodiment of the application, the measure range is set to be in a range from 15 cm to 60 cm, so that unnecessary data calculation can be avoided. Specifically, as shown in FIG. 18, the step S2 includes steps S20 to S22.

At step S20, original data of the distance of the eyesight protection device 02 is obtained. Step S20 specifically includes the following:

The millimeter-wave radar 21 divides the data transmitted and received by the millimeter-wave radar 21 into a plurality of data frames, signals of the data frames are recorded as complex signals in the millimeter-wave radar 21, and the original data of the distance of the eyesight protection device 02 is obtained according to the transmitted and received complex signals.

At step S21, the original data is processed to obtain a data value. Specifically, step S21 includes:

acquiring a plurality of amplitudes measured by the radar by processing the original data; finding extreme points of the plurality of amplitudes; screening and merging closer extreme points; weighting and ranking all of the extreme points, with a weighting factor including but not limited to, the distance, a mean value of amplitudes near the extreme point, or a mean value of the amplitudes; and outputting the weighted first-ranked value as the data value.

Figure 19:
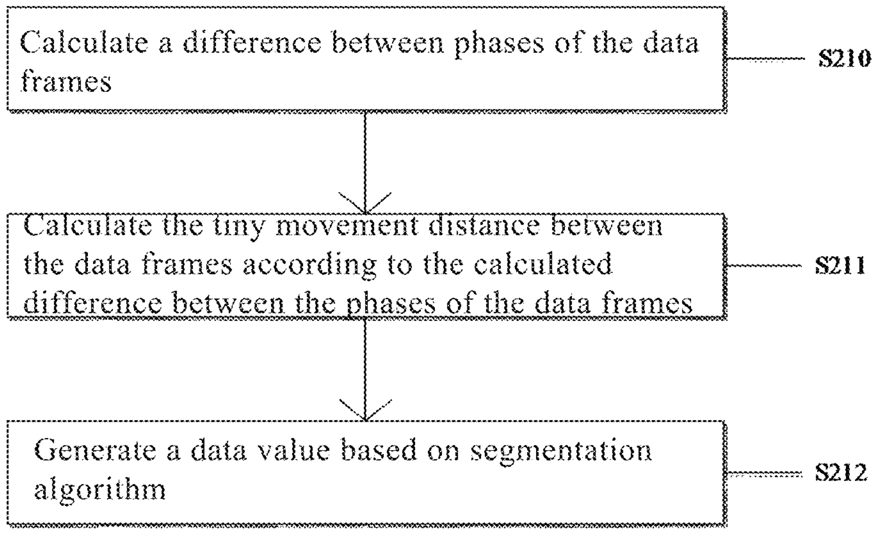
FIG. 19 is a schematic diagram showing steps S210 to S212 in the present application.

In some embodiments, as shown in FIG. 19, alternatively, step S21 of obtaining a data value may include steps S210 to S212.

At step S210, a difference between phases of the data frames is calculated.

At step S211, a tiny movement distance between the data frames is calculated according to the calculated difference between the phases of the data frames.

At step S212, the distance ranging from 15 cm to 60 cm is divided into a plurality of sections with each of the sections being 2.5 cm. A weighted displacement value for the tiny movement distance in each of the sections and a weighted displacement value for the whole distance are calculated, wherein a weighting factor is a signal amplitude. When no moving object exists within the range of the distance, a probability that a sign of a weighted displacement value for each segment is consistent with a sign of a weighted displacement value for the whole distance is 0.5. When a moving object exists in the range of the distance, the sign of the weighted displacement value for each segment is consistent with the sign of the weighted displacement value for the whole distance. The number of times is detected that a sign of a weighted displacement value for each of first N frames is consistent with the sign of the weighted displacement value for the whole distance; and when the number of times meets an upper limit of the normal distribution range, it is determined that an object exists here and a data value is generated.

In this way, the influence of the signals generated by other objects around the user on the measured data value can be better eliminated, and the generated data value is more accurate.

In some embodiments, alternatively, the step of S212 may be replaced with step S2121.

At step S2121, the distance ranging from 15 cm to 60 cm is divided into a plurality of sections with each section being 2.5 cm, and a weighted displacement value of a tiny movement distance in each section is calculated, with a weighting factor being a signal amplitude. When no moving object exists in the range of the distance, a weighted displacement value in each section has a random sign, and the conversion times of signs of weighted displacement values for the data of first N frames detected present a normal distribution near N/2. When a moving object exists in the range of the distance, the conversion times of the signs of the weighted displacement values for the data of the first N frames detected is decreased to a lower limit of the normal distribution, and it is determined that an object exists in the range of the distance and generate a data value.

At step S22, the original data value is classified and filtered to generate the distance. Specifically, step S22 include:

filtering out (i.e. removing) abnormal data values including, but not limited to, obviously wrong sight distance due to turning pages and hand shielding of the book. Filtering out includes, but is not limited to, performing smoothing filtering process by using median, mean, etc. to reduce the impact of the wrong sight distance. And then, k-mean, svm or other algorithms are used to classify and screen the filtered out abnormal data values, so as to obtain the data values as the distance between the user and the reading material 01 he or she read.

At step S3, the duration during which the distance between the user and the reading material 01 read by the user is less than a first predetermined value is determined.

Specifically, when the distance measured by the millimeter-wave radar 21 and received by the MCU is smaller than the first predetermined value, it is determined that the distance between the user and the reading material 01 read by the user is too close. At this time, the MCU records the duration of the distance being less than the first predetermined value and stores the duration in the storage circuit 5 of the eyesight protection device 02 for subsequent processing and analysis.

At step S4, when the distance between the user and the reading material 01 read by the user is smaller than the first predetermined value and the duration is greater than or equal to a second predetermined value, the alarm circuit 3 of the eyesight protection device 02 sends an alarm information to the user.

Specifically, when the distance between the user and the reading material 01 read by the user is smaller than the first predetermined value and the duration is greater than or equal to the second predetermined value, that is, the user has been reading the book for a long time at a too close distance from the book 01, the eyesight protection device 02 sends the alarm signal to the user to remind the user that the reading distance is too close and please keep far away from the reading material 01. In this way, the phenomenon can be avoided that the normal learning of students is influenced due to unnecessary reminding caused by the fact that the student reads the reading material temporarily at the over-close reading distance between the student and the reading material and caused by the errors existing in the eyesight protection device 02, and the user is reminded that the reading distance is too close and please keep far away from the reading material 01, so as to achieve the effect of protecting the eyesight of the user. In the embodiment, the user is a student, the reading material 01 is a book studied by the student, and the first predetermined value is in a range from 3 to 5 minutes.

At step S5, when the distance between the user and the reading material 01 read by the user is greater than or equal to the first predetermined value, the duration of the distance being greater than the first predetermined value is calculated; and when the duration is greater than or equal to a fourth predetermined value, the alarm circuit 3 of the eyesight protection device 02 stops sending the alarm signal to the user.

Specifically, after the user receives the alarm signal and gets far away from the reading material 01, when the distance between the user and the reading material 01 read by the user is greater than the first predetermined value, the duration is calculated, and when the duration is greater than or equal to the fourth predetermined value, that is, the duration, during which the distance between the user and the reading material 01 is greater than the first predetermined value, is long enough, and at the moment, the alarm circuit 3 of the eyesight protection device 02 stops sending out the alarm signal. In this way, the eyesight protection device 02 stops sending out the alarm signal in the case where the distance between the user and the reading material is greater than the first predetermined value for a time long enough. Therefore, when a student uses the eyesight protection device 02 in the embodiment for a long time, it is helpful to develop the habit of reading outside the first predetermined value, so as to develop a reading habit that helps to protect the eyesight, and achieve the effect of long-term eyesight protection.

After step S5 is performed, step S2 is continuously repeated until the eyesight protection device 02 is turned off.

In some embodiments, step S21 of processing the original data to obtain a data value further includes step S2100.

Figure 20:
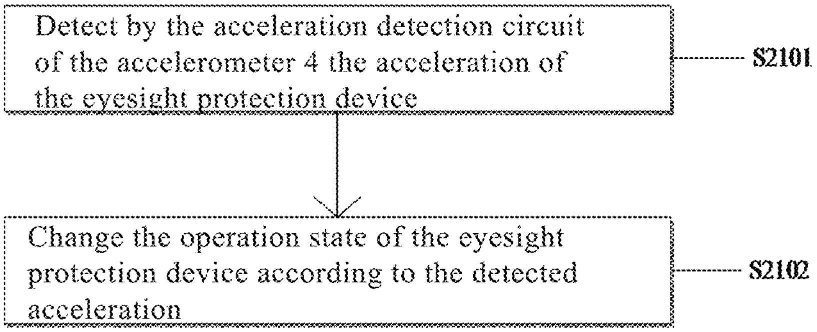
FIG. 20 is a schematic diagram showing steps S2101 to S2102 in the present application.

At step S2100, the acceleration of the eyesight protection device 02 is detected by an acceleration detection circuit of an accelerometer 4 of the eyesight protection device 02. When it is determined that the acceleration detected by the acceleration circuit of the accelerometer 4 is smaller than a third predetermined value, a second control signal is generated and sent to a frequency conversion circuit, so that the frequency conversion circuit changes the frequency at which the acceleration detection circuit detects the acceleration. Specifically, as shown in FIG. 20, step S2100 includes steps S2101 and S2102.

At step S2101, the acceleration detection circuit of the accelerometer 4 detects the acceleration of the eyesight protection device.

Specifically, the accelerometer 4 includes the acceleration detection circuit configured to detect the acceleration of the eyesight protection device 02 and transmit the detected acceleration to the MCU via an I2C interface. Since the eyesight protection device 02 is provided on the reading material 01, the acceleration of the eyesight protection device 02 is the acceleration of the reading material 01. Whether a user is reading the reading material 01 is determined according to the acceleration information of the reading material 01.

At step S2102, the MCU judges the acceleration, and MCU changes the operation state of the eyesight protection device 02 in response to that the frequency changes at which the acceleration detection circuit detects the acceleration. Specifically, step S2102 includes steps S21021 and S21022.

At step S21021, when the acceleration is significantly greater than or equal to a third predetermined value and the accumulated speed value fluctuates around a zero point and the eyesight protection device is in the sleep state, the MCU generates a fourth control signal according to the current acceleration. The frequency conversion circuit increases the frequency at which the acceleration detection circuit detects the acceleration in response to the fourth control signal, so that the operation state of the eyesight protection device 02 switches from the sleep state to the normal operation state. When the acceleration is significantly greater than or equal to a third predetermined value and the accumulated speed value fluctuates around a zero point and the eyesight protection device 02 is in the normal operation state, and the operation state of the eyesight protection device 02 remains unchanged.

At step S21022, when the acceleration acquired by the accelerometer 4 is smaller than the third predetermined value and the accumulated speed value deviates from the zero point, and when the distance detected by the millimeter-wave radar detection circuit 1 and acquired by the MCU is zero, if the eyesight protection device 02 is in the normal operation state, the MCU generates a third control signal according to the current acceleration. The frequency conversion circuit changes the frequency at which the acceleration detection circuit detects the acceleration in response to the third control signal, and the MCU changes the operation state of the eyesight protection device 02 from the normal operation state to the sleep state according to the current acceleration. If the eyesight protection device 02 is in the sleep state, the operation state of the eyesight protection device 02 remains unchanged.

The change of the operation state of the eyesight protection device 02 is thus completed.

It will be understood that the above embodiments are merely exemplary embodiments employed to illustrate the principles of the present disclosure, and the present disclosure is not limited thereto. It will be apparent to one of ordinary skill in the art that various changes and modifications can be made therein without departing from the spirit and scope of the present disclosure, and these changes and modifications are to be considered within the scope of the present disclosure.

What is claimed is:

1. An eyesight protection device, comprising a millimeter-wave radar detection circuit, a control circuit, an alarm circuit, an accelerometer, and a gyroscope, wherein the millimeter-wave radar detection circuit is configured to detect a distance between a user and a reading material read by the user, the control circuit is configured to generate a first control signal at least in response to the distance detected by the millimeter-wave radar detection circuit is smaller than a first predetermined value, and the alarm circuit is configured to send out an alarm signal in response to the first control signal, the accelerometer comprises an acceleration detection circuit and a frequency conversion circuit, the acceleration detection circuit is configured to detect an acceleration of the reading material, the control circuit is configured to generate a second control signal in response to the acceleration detected by the acceleration detection circuit is smaller than a third predetermined value, the frequency conversion circuit is configured to change a frequency at which the acceleration detection circuit detects the acceleration in response to the second control signal, the gyroscope is configured to detect angle information of the millimeter-wave radar detection circuit, and the control unit is configured to switch an operation state of the eyesight protection device from a sleep state to an operation state in response to both of the angle information detected by the gyroscope and the acceleration detected by the acceleration detection circuit are not zero.

2. The eyesight protection device of claim 1, wherein the control circuit is configured to generate the first control signal when it is determined that a duration, during which the distance detected by the millimeter-wave radar detection circuit is less than the first predetermined value, is greater than a second predetermined value.

3. The eyesight protection device of claim 1, wherein the accelerometer is communicatively coupled to the control circuit via an $I^2C$ interface.

4. The eyesight protection device of claim 1, further comprising a storage circuit configured to store firmware data of the control circuit and the distance detected by the millimeter-wave radar detection circuit.

5. The eyesight protection device of claim 4, wherein the storage circuit comprises a first flash and a second flash, the first flash is configured to store the firmware data of the control circuit, and the second flash is configured to store the distance detected by the millimeter-wave radar detection circuit.

6. The eyesight protection device of claim 5, wherein the storage circuit is communicatively coupled to the control circuit via a QSPI interface.

7. The eyesight protection device of claim 1, further comprising a first power circuit configured to provide power to the eyesight protection device, wherein the first power circuit further comprises a first power sub-circuit and/or a second power sub-circuit, the first power sub-circuit is configured to supply power to the control circuit, and the second power sub-circuit is configured to supply power to the first power sub-circuit and the control circuit.

8. The eyesight protection device of claim 7, wherein the first power sub-circuit is configured to be communicatively coupled to the control circuit via a PMU interface, and the second power sub-circuit is communicatively coupled to the control circuit via a VBUS interface.

9. The eyesight protection device of claim 1, further comprising: a USB circuit and a Bluetooth circuit, wherein the eyesight protection device is communicatively coupled to a user terminal via the USB circuit and the Bluetooth circuit, such that data including the distance is transmitted from the eyesight protection device to the user terminal.

10. The eyesight protection device of claim 1, further comprising a WIFI circuit and a mobile communication circuit, wherein the eyesight protection device is communicatively coupled to a network device via the WIFI circuit and the 4G circuit, such that data is transmitted between the network device and the eyesight protection device.

11. The eyesight protection device of claim 1, wherein the gyroscope is communicatively coupled to the control circuit via an SPI interface or an $I^2C$ interface.

12. The eyesight protection device of claim 1, wherein the alarm circuit comprises a buzzer communicatively coupled to the control circuit.

13. An eyesight protection system, comprising the eyesight protection device of claim 1 and a user terminal, wherein the eyesight protection device is configured to detect data of the user, the user terminal is configured to display the data of the user on the user terminal, and the eyesight protection device is communicatively coupled to the user terminal.

14. The eyesight protection system of claim 13, further comprising a network device configured to: be communicatively coupled to a plurality of eyesight protection devices for a plurality of the users; and store and analyze the data of the plurality of the users.

15. A detection method for an eyesight protection device, comprising:

detecting, by a millimeter-wave radar detection circuit, a distance between a user and a reading material read by the user;

generating, by a control circuit, a first control signal, at least in response to the distance detected by the millimeter-wave radar detection circuit is smaller than a first predetermined value; and sending out, by an alarm circuit, an alarm signal in response to the first control signal, wherein the detection method further comprises:

detecting, by an acceleration detection circuit of an accelerometer, an acceleration of the eyesight protection device;

generating, by the control circuit, a second control signal in response to the acceleration detected by the acceleration detection circuit is smaller than a third predetermined value;

changing, by a frequency conversion circuit of the accelerometer, a frequency at which the acceleration detection circuit detects the acceleration in response to the second control signal;

detecting, by a gyroscope, angle information of the millimeter-wave radar detection circuit; and switching, by the control unit, an operation state of the eyesight protection device from a sleep state to an operation state, in response to both of the angle information detected by the gyroscope and the acceleration detected by the acceleration detection circuit are not zero.

16. The detection method of claim 15, wherein detecting, by the millimeter-wave radar detection circuit, the distance between the user and the reading material read by the user, comprises:

acquiring a data value by processing original data detected by the millimeter-wave radar detection circuit, and generating the distance by classifying and filtering the data value.

* * * * *